United States Patent Office 2,912,759
Patented Nov. 17, 1959

2,912,759

PRODUCTION OF DENTURES HAVING MATERIALLY REDUCED TENDENCY TO ADHERE TO CHEWING GUM

Walter Schlesinger, Chicago, Ill., assignor to Wm. Wrigley, Jr., Company, Chicago, Ill., a corporation of Delaware No Drawing. Application March 11, 1955
Serial No. 493,822

11 Claims. (Cl. 32—2)

My invention relates to dental prosthesis and is particularly concerned with the production of dental restorations, of the type of plates (with or without teeth), artificial teeth, jackets, crowns, inlays, facings, bridgework and the like, hereafter for convenience generically identified as dentures, having certain particularly advantageous properties and characteristics in relation to freedom from tackiness with respect to chewing gum.

Dentures of the foregoing types are conventionally made by mixing together resin-forming ingredients to produce a doughy or putty-like mass which is then pressed into a mold cavity and cured. It is usual commercial practice to employ, as the resin-forming ingredients, mixtures of acrylic polymers and acrylic monomers, notably methyl methacrylate polymer and methyl methacrylate monomer (which may contain the usual commercial inhibitors) in proportions of the order of about 2 parts by weight of the polymer to 1 part by weight of the monomer to form the dough-like plastic mass. Such plastic dough is then placed into a plaster or plaster-like mold lined with a denture metal foil, such as tin foil or aluminum foil, or with a thin sheet or film of polyethylene or film-forming alginate composition, so that, when the mold is closed and placed in water or the like at curing temperatures, the curing takes place with the polymerizable acrylic resinous dough in contact with the metal foil or film of polyethylene or alginate, as the case may be. In any event, such dentures have the objectionable property of causing chewing gum, such as chicle-base chewing gums, to adhere thereto when said chewing gum is masticated in the mouth in contact with such dentures. This fact has discouraged large numbers of people, who have artificial dentures, and who enjoy the chewing of gum, from so doing.

I have discovered that artificial dentures can be prepared so that they are characterized by substantial freedom from the tendency of chewing gum to adhere thereto when chewing gum is masticated in the mouth in contact with said dentures. This is accomplished by initially depositing a film or thin coating on a suitable base material, the latter having the configuration of the desired denture, and then subjecting the thus coated denture base material to treatment with a solution of a strongly alkaline material, all as is hereafter described in detail.

The denture base material is advantageously made from a resinous or synthetic plastic, illustrative examples of which are polystyrene, vinyl resins, acrylic materials such as polymethyl methacrylate, modified polymethyl methacrylate and polyacrylate materials commonly used in making dentures, and other copolymers of methyl methacrylate with various cross-linking and modifying agents. The selected denture base material and the coating compositions which are deposited thereon, as hereafter described, should, of course, be compatible with each and of such character that a firm and strong bond is formed therebetween. Of particular utility for the denture base material are acrylic resins, particularly those of the type which have heretofore been used in the art for the production of dentures.

The coating materials comprise acrylic polymers, particularly of the types described below. They may, for instance, be derived from polymethacrylic acid, polyethacrylic acid, polyethyl acrylate, polymethyl acrylate, acrylamide, methacrylamide, acrylic acid, methacrylic acid, copolymers of methacrylic acid and acrylates with methacrylate esters containing, for example, 30 to 67% of the methacrylate ester. Such acrylic polymers are particularly advantageously those which contain carboxyl groups, but other polar groups may be present. The coating step may be effected in any suitable manner as, for example, by dipping or spraying the denture base with the acrylic material, the latter preferably being in solution.

After the coating step, the resulting coated denture is contacted with a solution of a strongly alkaline material for a period of time sufficient to bring about the surface modification of the coating whereby to effect said reduction in adherence to the chewing gum. Among the strongly alkaline materials which can be utilized with excellent effect are, for example, the caustic alkalies, namely, sodium hydroxide and potassium hydroxide; lithium hydroxide; ammonium hydroxide, trisodium phosphate; sodium carbonate; potassium carbonate; and mixtures of any two or more thereof. Of particular utility are sodium hydroxide and potassium hydroxide. The concentration of the strongly alkaline material in the solutions thereof is suitably in the range of about 1%, preferably about 5%, to about 20%, by weight, although it may be even higher than 20%. I find it very satisfactory, as a general rule, to use an approximately 10% or 10 to 15% solution. While, under certain circumstances, the pH of the strongly alkaline solution may be as low as 8.8, from a practical standpoint the pH should be at least 10.5 and, still more advantageously, should be 13 or higher. The said alkaline solutions are utilized at temperatures which are not so high as to cause deformation of the shape of the denture. I prefer to operate the solution at room temperature or in the general range of 25 to 30 degrees C. At such temperatures, the coated dentures are maintained in contact with the said alkaline solutions for a sufficient time to bring about the necessary surface modification of the coating. This will usually be several hours, ordinarily at least about 3½ hours and usually from about 10 to about 18 hours. It will be understood that the higher the concentration of the strongly alkaline solution and the higher the temperature at which said solution is used the shorter may be the time of duration of the treatment. While I have referred to bringing about surface modification of the coating, it should be understood that the effect obtained extends down below the surface of said coating for some little depth, which varies with the exact composition of the acrylic material of which the coating is made and the precise treatment to which said coating is subjected pursuant to my invention.

The denture base material, the acrylic coating composition and the treatment with the strongly alkaline solution should, of course, be so correlated as not adversely to affect the usual physical and like properties characteristic of satisfactory artificial dentures, such as water sorption, solubility, dimensional stability, tissue tolerance, hardness, lack of brittleness, and the like.

The following examples are illustrative of the production of dentures in accordance with my present invention. Various changes can, of course, be made, within the spirit of the invention and the guiding teachings which I provide herein, without departing from the principles disclosed.

Example 1

An acrylic upper denture (made in the usual way by polymerizing in a mold a doughy mixture made from 2 parts polymethyl metacrylate powder and 1 part methyl methacrylate monomer) is dipped into benzene for one-half minute, removed therefrom, then dipped into a 1.5% solution of polyethyl acrylate in benzene for one-half minute, removed and hung up to dry. The resulting denture, having a coating thereon of polyethyl acrylate, is then immersed for 16 hours in an aqueous solution containing 10% sodium hydroxide at 25 degrees C. The denture is then thoroughly rinsed in water. It is substantially tack-free to chewing gum.

Example 2

An acrylic dental plate, of the type described in Example 1, is dipped into benzene for one-half minute, removed therefrom, then dipped in a 1% solution of a copolymer of equal parts of methyl methacrylate and ethyl acrylate in a solvent comprising equal parts of benzene and carbon tetrachloride, removed and hung up to dry. The resulting denture, having a coating thereon of the aforesaid methyl methacrylate-ethyl acrylate copolymer, is then immersed for 14 hours in an aqueous solution containing 12% potassium hydroxide at 30 degrees C. The denture is then thoroughly rinsed in water. It is substantially tack-free to chewing gum.

Example 3

A cleaned polystyrene denture is immersed for one-half minute in a 1% solution of polymethyl acrylate in a solvent comprising equal parts of benzene and xylene, is then removed and allowed to air-dry for about 2 hours. It is then immersed in a sodium hydroxide solution as is Example 1 and rinsed in water. It is substantially tack-free to chewing gum.

Example 4

A cleaned conventional acrylic denture is dipped in methacrylic acid containing 0.4% benzoyl peroxide, removed and heated in a nitrogen atmosphere to about 120 degrees C. for a few minutes to polymerize the methacrylic acid and thereby form a strongly adherent coating of polymethylacrylic acid on said acrylic denture. Said denture is cooled, rinsed with water, immersed for 15 hours in an aqueous solution containing 10% sodium hydroxide at 25 degrees C., removed and then thoroughly rinsed with water. It is substantially tack free to chewing gum.

What I claim as new and desire to protect by Letters Patent of the United States is:

1. In a method of making dentures of a character such as to be substantially free of the tendency of chewing gum to adhere thereto when masticated in contact with such dentures, the steps which comprise coating a denture with a film of a strongly adherent acrylic polymer, and then contacting said coated denture with a solution of a strongly alkaline material for a period of time sufficient to bring about a surface modification of said coating whereby to render the same substantially free of adherence to chewing gum.

2. In a method of making dentures of a character such as to be substantially free of the tendency of chewing gum to adhere thereto when masticated in contact with such dentures, the steps which comprise coating an acrylic denture with a film of a strongly adherent acrylic polymer, and then contacting said coated denture with a solution of a strongly alkaline material for a period of time sufficient to bring about a surface modification of said coating whereby to render the same substantially free of adherence to chewing gum.

3. In a method of making dentures of a character such as to be substantially free of the tendency of chewing gum to adhere thereto when masticated in contact with such dentures, the steps which comprise coating a denture with a strongly adherent film of an acrylic polymer, and then contacting said coated denture with an aqueous solution containing from 1% to 20% caustic alkali for a period of time, at least several hours, sufficient to bring about a surface modification of said coating whereby to effect said reduction in adherence to chewing gum.

4. In a method of making dentures of a character such as to be substantially free of the tendency of chewing gum to adhere thereto when masticated in contact with such dentures, the steps which comprise coating a denture with a strongly adherent film of an acrylic polymer selected from the group consisting of polymethacrylic acid, polymethyl acrylate, polyacrylic acid, polyethyl acrylate, copolymers of methacrylic acid with methacrylate esters containing up to 67% of said methacrylate esters, and copolymers of lower alkyl acrylates with methacrylate esters containing up to 67% of said methacrylate esters, and then contacting said coated denture with an aqueous solution containing from 1% to 20% caustic alkali for a period of time, at least several hours, sufficient to bring about a surface modification of said coating whereby to effect said reduction in adherence to chewing gum.

5. In a method of making dentures of a character such as to be substantially free of the tendency of chewing gum to adhere thereto when masticated in contact with such dentures, the steps which comprise providing a denture made by polymerizing a doughy mixture including a methyl methacrylate polymer and a substantially lesser proportion of methyl methacrylate monomer, then coating said denture with a strongly adherent film of an acrylic polymer selected from the group consisting of polymethacrylic acid, polymethyl acrylate, polyacrylic acid, polyethyl acrylate, copolymers of methacrylic acid with methacrylate esters containing up to 67% of said methacrylate esters, and copolymers of lower alkyl acrylates with methacrylate esters containing up to 67% of said methacrylate esters, and then contacting said coated denture with a solution of a strongly alkaline material having a pH of at least 10.5 for a period of time sufficient to bring about a surface modification of said coating whereby to effect said reduction in adherence to chewing gum.

6. In a method of making dentures of a character such as to be substantially free of the tendency of chewing gum to adhere thereto when masticated in contact with such dentures, the steps which comprise providing a denture made by polymerizing a doughy mixture including a methyl methacrylate polymer and a substantially lesser proportion of methyl methacrylate monomer, then coating said denture with a strongly adherent film of an acrylic polymer selected from the group consisting of polymethacrylic acid, polymethyl acrylate, polyacrylic acid, polyethyl acrylate, copolymers of methacrylic acid with methacrylate esters containing up to 67% of said methacrylate esters, and copolymers of lower alkyl acrylates with methacrylate esters containing up to 67% of said methacrylate esters, and then contacting said coated denture with an aqueous solution containing from 5% to 20% caustic alkali for a period of time, at least several hours, sufficient to bring about a surface modification of said coating whereby to effect said reduction in adherence to chewing gum.

7. In a method of making dentures of a character such as to be substantially free of the tendency of chewing gum to adhere thereto when masticated in contact with such dentures, the steps which comprise providing a denture made by polymerizing a doughy mixture including a methyl methacrylate polymer and a substantially lesser proportion of methyl methacrylate monomer, then coating said denture with a strongly adherent film of an acrylic polymer selected from the group consisting of polymethacrylic acid, polymethyl acrylate, polyacrylic acid, polyethyl acrylate, copolymers of methacrylic acid with methacrylate esters containing up to 67% of said methacrylate esters, and copolymers of lower alkyl acrylates with methacrylate esters containing up to 67% of said methacrylate esters, and then contacting said coated denture with a strongly alkaline aqueous solution having a pH of at least 10.5 for a period of time, at least several hours, sufficient to bring about a surface modification of said coating whereby to effect said reduction in adherence to chewing gum.

8. A denture having the property of substantial freedom from the tendency of chewing gum to adhere thereto when said chewing gum is masticated in the mouth in contact with said denture, said denture having a coating of a strongly adherent acrylic polymer, the surface characteristics of said coating having been modified by an after-treatment with a solution of a strongly alkaline material for a period of time sufficient to bring about said surface modification to the extent of rendering said surface substantially free of adherence to chewing gum.

9. A denture having the property of substantial freedom from the tendency of chewing gum to adhere thereto when said chewing gum is masticated in the mouth in contact with said denture, said denture having a strongly adherent coating thereon of an acrylic polymer, the surface characteristics of said coating having been modified by an after-treatment with an aqueous solution containing from 1% to 20% caustic alkali for a period of time, at least several hours, sufficient to bring about said surface modification to the extent of rendering said surface substantially free of adherence to chewing gum.

10. A denture having the property of substantial freedom from the tendency of chewing gum to adhere thereto when said chewing gum is masticated in the mouth in contact with said denture, said denture being made from a polymethyl methacrylate denture having a strongly adherent coating thereon of an acrylic polymer selected from the group consisting of polymethacrylic acid, polymethyl acrylate, polyacrylic acid, polyethyl acrylate, copolymers of methacrylic acid with methacrylate esters containing up to 67% of said methacrylate esters, and copolymers of lower alkyl acrylates with methacrylate esters containing up to 67% of said methacrylate esters, the surface characteristics of said coating having been modified by an after-treatment with a strongly alkaline aqueous solution having a pH of at least 10.5 for a period of time, at least several hours, sufficient to bring about said surface modification to the extent of rendering said surface substantially free of adherence to chewing gum.

11. A denture having the property of substantial freedom from the tendency of chewing gum to adhere thereto when said chewing gum is masticated in the mouth in contact with said denture, said denture being made from a polymethyl methacrylate denture having a strongly adherent coating thereon of an acrylic polymer selected from the group consisting of polymethacrylic acid, polymethyl acrylate, polyacrylic acid, polyethyl acrylate, copolymers of methacrylic acid with methacrylate esters containing up to 67% of said methacrylate esters, and copolymers of lower alkyl acrylates with methacrylate esters containing up to 67% of said methacrylate esters, the surface characteristics of said coating having been modified by an after-treatment with an aqueous solution containing from 1% to 20% caustic alkali for a period of time, at least several hours, sufficient to bring about said surface modification to the extent of rendering said surface substantially free of adherence to chewing gum.

References Cited in the file of this patent

UNITED STATES PATENTS

| | | |
|---|---|---|
| 2,369,057 | Leary et al. | Feb. 6, 1945 |
| 2,514,075 | Kelly | July 4, 1950 |
| 2,604,668 | Miller et al. | July 29, 1952 |